Figure 1:
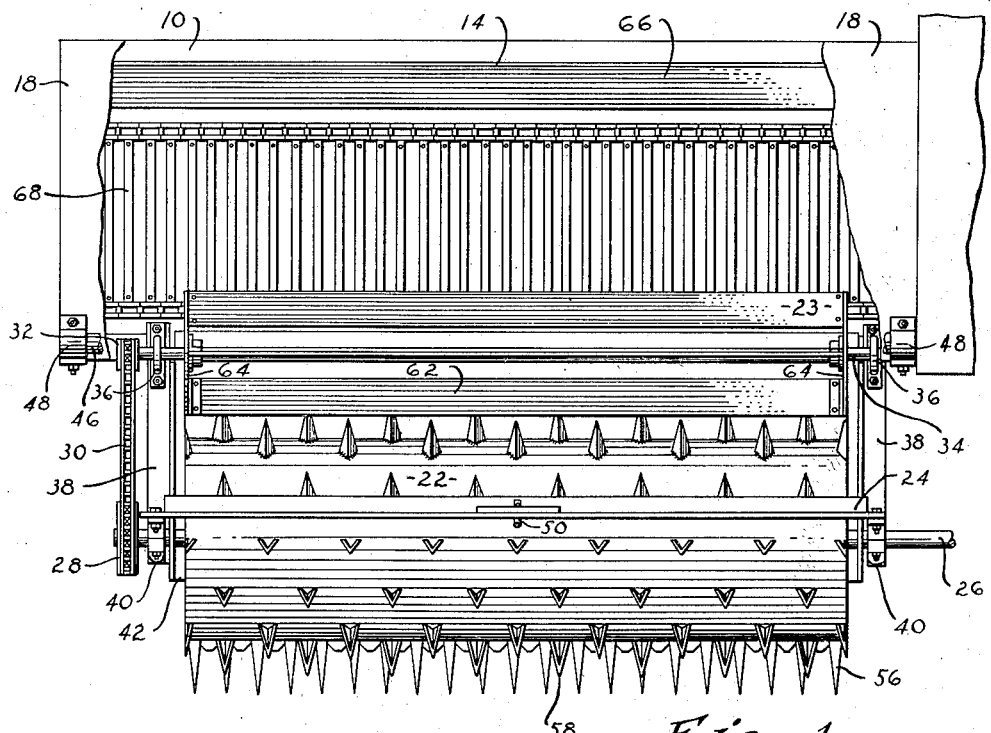

INVENTOR.
Elmer C. Small
BY
ATTORNEYS.

Patented Mar. 1, 1949

2,463,061

UNITED STATES PATENT OFFICE 2,463,061

ALFALFA HARVESTER

Elmer C. Small, Neodesha, Kans., assignor to W. J. Small Company, Inc., Neodesha, Kans.

Application May 12, 1947, Serial No. 747,536

3 Claims. (Cl. 56—364)

This invention relates generally to farm implements and more specifically to harvesters particularly adapted for handling alfalfa hay in the field.

Heretofore alfalfa hay has been harvested in many different ways, one of which constitutes cutting the same in the field, elevating the cut hay into a truck or other transportation means, hauling the same to a mill and laboriously pitching the same into a cutter with pitchforks. Obviously this method has many disadvantages from the standpoint of work involved as well as time consumed.

The primary object of this invention, therefore, is to provide an implement for simplifying the harvesting of alfalfa or other types of hay by the provision of a rotatable pickup mechanism for receiving the cut hay and directing the same into a beater prior to elevation of the hay into a truck or other vehicle.

The most important object of this invention is to provide a harvester having a rotatable spiked pickup drum disposed adjacent to the sickle bar and a rotatable beater assembly for receiving the hay from the drum and directing the same against the innermost face of one wall of a hollow body or housing.

Another important object of this invention is to provide in a harvester having the aforesaid pickup drum and beater assembly, a conveyor in the housing for moving the chopped hay toward one end of the housing where the same may be elevated into a truck or the like, which conveyor is disposed relative to the beater assembly to receive the hay only after the same has been dircted against one wall of the housing.

A still further object of this invention is to provide a harvester having a rotatable pickup drum and a curved scoop associated therewith and underlying the drum to cooperate with the latter in directing the cut hay tangentially into beater assembly.

Another object of this invention is to provide a harvester having a beater assembly in the form of a rotatable reel provided with a plurality of vanes which assembly is disposed to receive the hay from the drum and direct the same laterally and transversely across a conveyor where the same strikes an inclined wall prior to movement upon the conveyor.

A still further important object of this invention is to provide a harvester having an assembly of parts formed by the aforesaid pickup drum, beater assembly, inclined housing wall and conveyor, all arranged to eliminate any throw back of the material by obviating any possibility of congestion from the time the hay is cut until the same reaches the conveyor.

Another object of this invention is to provide a harvester having a rotatable spiked pickup drum so formed to further eliminate congestion by providing a "back rake" in each of the spikes, to the end that hay is held against the aforesaid curved scoop instead of clinging to the spikes.

Figure 2:
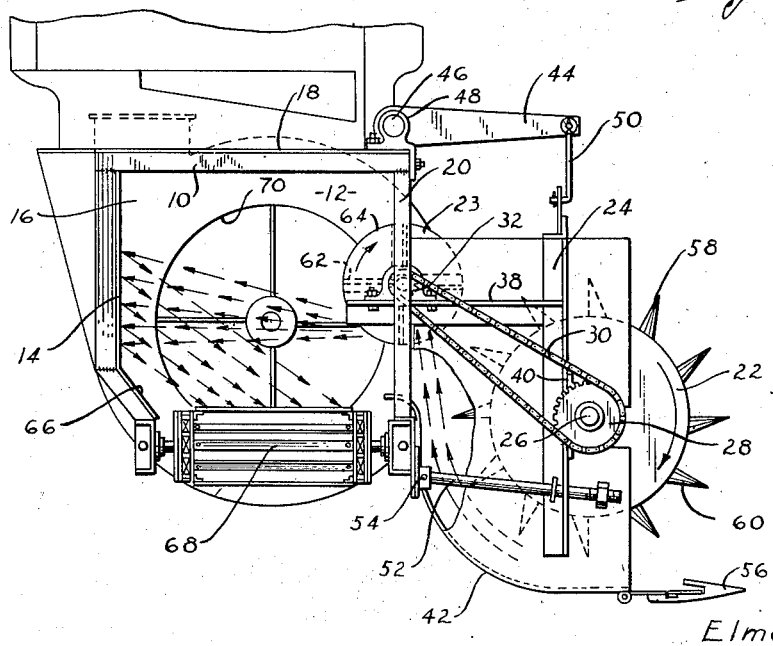

Many minor objects will be made clear or become apparent during the course of the following specification, reference being had to the accompanying drawing, wherein:

Fig. 1 is a fragmentary top plan view of a harvester made in accordance with my present invention, parts being broken away for clearness, and Fig. 2 is an end elevational view thereof.

The implement about to be described includes many parts which form no part of this invention and, therefore, the same have not been shown. These parts include the chassis means for attachment to the drawbar or a tractor or the like, structure for elevating the hay into a truck or the like, as well as details of construction with respect to connection of the movable parts thereof with a suitable prime mover. This implement therefore, includes a frame broadly designated by the numeral 10, which defines a housing 12 having a side wall 14, an end wall 16 and a top 18. The frame 10 extends downwardly as at 20 in opposed relation to the wall 14 of housing 12 to present an open side within which is rotatably mounted an elongated beater assembly broadly designated by the numeral 23. Extending forwardly and in spaced relation from the framework 20 is a rotatable pickup drum 22 supported by suitable framework 24. This drum 22 constitutes an elongated cylinder and is supported for rotation on a substantially horizontal axis by frame 24 through the medium of a shaft 26.

Any suitable means for driving the shaft 26 and thereby the drum 22 may be provided, such as by connection thereof with the power takeoff of the tractor which serves to transport the harvester over the field of hay to be cut. The opposite end of this shaft 26 carries a sprocket wheel 28 over which passes a chain 30 to connect with a relatively small sprocket 32, forming a part of the beater assembly 23. This beater assembly 23 includes a shaft 34 journalled in spaced apart bearings 36 carried by brackets 38 extending rearwardly from frame members 24. The shaft 26 for drum 22 is journalled in spaced apart bearings 40 carried by the frame members 24 intermediate the ends thereof. The entire assembly including drum 22, beater assembly 23 and a scoop 42 is carried by the frame 10 through the medium of an arm 44, extending radially from a shaft 46. This shaft 46 is journalled within bearings 48 on frame 10 and the arm 44 is welded or otherwise fixed thereto.

The outermost free end of the arm 44 has linkage 50 depending therefrom and joined to the framework 24. The frame members 24 are each slotted near the lowermost ends thereof to slidably receive an arm 52 which has one end thereof pivotally secured as at 54 to the members 20 of frame 10.

It is clear from the foregoing that rotation of the shaft 46 through any medium not shown will swing the arm 44 to raise and lower the drum 22, scoop 42 and cutter bar mechanism 56 to desired heights above the surface of the ground. The scoop 42 is co-extensive in length with the drum 22 and disposed in spaced underlying relationship therewith. This scoop 42 extends from the cutter bar mechanism 56 to a point within the housing 12 near the lowermost end thereof as shown in Fig. 2. The drum 22 is provided with a plurality of spikes 58 disposed in staggered relationship throughout the entire outermost surface of drum 22. These spikes 58 extend laterally outwardly from drum 22 and terminate in a pointed end. Spikes 58 are V-shaped in cross section and one edge 60 thereof is inclined outwardly from the pointed end of spike 58, the inclination being forwardly and in the direction of rotation of the drum 22, which direction is indicated by an arrow in Fig. 2. As the drum 22 rotates, the spikes 58 serve to move the hay that is cut by the cutting mechanism 56 into the beater assembly 23. The specific design of these spikes 58 as above described presents a "back rake" which serves to hold the cutter material against the curved surface of scoop 42 and thus prevents clinging of such material to the drum 22 or to the spikes 58 thereof.

It has been found desirable to rotate the drum 22 at a speed of approximately 350 revolutions per minute and the centrifugal force caused by such rotation of drum 22 plus the action of spikes 58 serves to throw the hay tangentially into the beater assembly 23, as indicated by arrows in Fig. 2. The beater assembly 23 constitutes an addition to shaft 34, a reel secured to shaft 34 formed by a plurality of elongated blades 62. These blades or vanes 62 are spaced equally about the axis of shaft 34 and are secured to a pair of end members 64 circumscribing shaft 34. This beater assembly 23 is caused to rotate in the direction indicated by an arrow shown in Fig. 2 through the medium of the chain 30 connected with the drum 22. The beater 23 should rotate at a relatively high speed, preferably about 760 revolutions per minute. Such fast rotation of beater 23 causes a breaking or chopping up of the hay which passes from the drum 22 and this chopped hay is then projected in the direction of the arrows shown in Fig. 2 against the wall 14 of housing 12. The lowermost end of this wall 14 is inclined, as at 66, toward a conveyor 68, which forms the bottom of housing 12 and underlies the direction of travel of the hay from beater 23 toward the wall 14. This conveyor 68 extends to a point beyond the innermost end of the beater 23 and the drum 22 to forward the chopped hay into a blower (not shown), the housing of which is indicated by the numeral 70.

While the operation of the harvester has been made clear throughout the above description, it is to be noted that the beater 23 projects the hay entirely across the conveyor 68 and then this hay is free to slide downwardly along the wall 14, including its inclined portion 66, to fall upon the conveyor 68. Throughout the path of travel of the cut hay from the sickle 56 along scoop 42 into the beater 32 and finally upon the conveyor 68, there is no possible opportunity for congestion and throw back to occur since each individual handling of the hay is separate and independent from the handling thereof in the immediately preceding steps. The harvesting operation is accomplished through the steps just defined without the necessity of manual handling of the hay and the entire operation may take place in a minimum of time and a great saving of expense.

While only one modification of the harvester has been illustrated and described, it is understood that many changes and modifications may be made without departing from the spirit of the invention or scope of the appended claims.

Having thus described the invention, what is claimed as new and desired to be secured by Letters Patent is:

1. In a crop pick-up and crop handling implement, a spiked crop gathering drum mounted for rotation on a substantially horizontal axis; means for receiving and directing the crop gathered by the drum toward a point spaced laterally from the latter; a rotatable reel within the path of travel of said directed crop formed to receive the crop and project the same in a substantially horizontal path away from the drum; a backstop for the crop emanating from the reel; and a conveyor disposed within the path of travel of said crop as the same falls from the backstop by force of gravity for moving the crop away from the backstop.

2. In a crop pick-up and crop handling implement, a spiked crop gathering drum mounted for rotation on a substantially horizontal axis; a rotatable reel disposed upwardly and rearwardly from said drum with its axis of rotation substantially parallel with said axis of rotation of the drum; a vertical wall spaced rearwardly from the reel; a conveyor at the lowermost edge of the wall below the reel and between the reel and wall; and a scoop underlying the drum for directing the crop gathered by said drum toward the reel, said reel rotating in a direction to project the crop received thereby toward the wall across the conveyor, whereby the crop falls by gravity from the wall to the conveyor.

3. In a crop pick-up and crop handling implement, a spiked crop gathering drum mounted for rotation on a substantially horizontal axis; a rotatable reel disposed upwardly and rearwardly from said drum with its axis of rotation substantially parallel with said axis of rotation of the drum; a vertical wall spaced rearwardly from the reel; a conveyor at the lowermost edge of the wall below the reel and between the reel and wall; and a scoop underlying the drum for directing the crop gathered by said drum toward the reel, said reel rotating in a direction to project the crop received thereby toward the wall across the conveyor, said conveyor being spaced below the path of travel of said crop toward the wall, whereby said crop reaches the conveyor only after falling from the wall by force of gravity.

ELMER C. SMALL.

REFERENCES CITED

The following references are of record in the file of this patent:

UNITED STATES PATENTS

| Number | Name | Date |
| --- | --- | --- |
| 969,227 | Warrenfeltz | Sept. 6, 1910 |
| 1,216,902 | Williams | Feb. 20, 1917 |
| 1,819,432 | Mickle | Aug. 18, 1931 |
| 1,847,399 | Innes | Mar. 1, 1932 |
| Re. 21,571 | Innes | Sept. 17, 1940 |